(12) United States Patent
Crouch et al.

(10) Patent No.: US 12,043,557 B2
(45) Date of Patent: Jul. 23, 2024

(54) METHOD OF FILTERING WATER

(71) Applicant: BP Exploration Operating Company Limited, Middlesex (GB)

(72) Inventors: John Henry Crouch, Bedfordshire (GB); James Lomax, Middlesex (GB); John Dale Williams, Beaconsfield (GB)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 673 days.

(21) Appl. No.: 16/319,328

(22) PCT Filed: Jul. 11, 2017

(86) PCT No.: PCT/EP2017/067443
§ 371 (c)(1),
(2) Date: Jan. 19, 2019

(87) PCT Pub. No.: WO2018/015223
PCT Pub. Date: Jan. 25, 2018

(65) Prior Publication Data
US 2019/0169050 A1 Jun. 6, 2019

(30) Foreign Application Priority Data

Jul. 21, 2016 (GB) .................................. 1612680

(51) Int. Cl.
*C02F 1/44* (2023.01)
*B01D 61/14* (2006.01)
(Continued)

(52) U.S. Cl.
CPC ............. *C02F 1/444* (2013.01); *B01D 61/14* (2013.01); *B01D 61/18* (2013.01); *B01D 61/22* (2013.01);
(Continued)

(58) Field of Classification Search
CPC ............. B01D 63/02; B01D 2313/083; B01D 2313/20; B01D 2313/54; B01D 2315/08;
(Continued)

(56) References Cited

U.S. PATENT DOCUMENTS

| 8,945,387 B2 * | 2/2015 | Adams | ..................... | C02F 1/44 |
| | | | | 210/321.89 |
| 2002/0117438 A1 * | 8/2002 | Blume | .................. | B01D 63/02 |
| | | | | 210/321.8 |

(Continued)

FOREIGN PATENT DOCUMENTS

| EP | 1743690 A1 | 1/2007 |
| EP | 3487607 B1 | 6/2020 |

(Continued)

OTHER PUBLICATIONS

Wise et al., Hydraulic Cleaning Methods for Ceramic Membranes—A More Conventional Approach to Facilitate Retrofits, Feb. 2, 2016, p. 3 (Year: 2016).*

(Continued)

*Primary Examiner* — Chester T Barry
(74) *Attorney, Agent, or Firm* — CONLEY ROSE, P.C.

(57) ABSTRACT

A method of operating a filtration unit of a filtration system includes
feeding, during filtration, feed water containing suspended particulate material to an inside of each of a plurality of hollow fibres through a first inlet and a second inlet of each hollow fibre while simultaneously removing a filtrate from an outside of each of the hollow fibres through an outlet of a filtration elements. In addition, the method includes feeding,
during back-washing, back-wash water to the outside of the hollow fibres through the outlet of the filtration element. Further the method includes discharging, in a first back-wash cycle, back-wash water containing (Continued)

entrained particulate material from the inside of the hollow fibres from one end thereof. Still further, the method includes discharging, in a second back-wash cycle, back-wash water containing entrained particulate material from the inside of the hollow fibres from the other end thereof.

20 Claims, 3 Drawing Sheets

(51) Int. Cl.
  *B01D 61/18* (2006.01)
  *B01D 61/22* (2006.01)
  *B01D 63/02* (2006.01)
  *B01D 65/02* (2006.01)
(52) U.S. Cl.
  CPC ........... *B01D 63/031* (2022.08); *B01D 65/02* (2013.01); *B01D 2313/54* (2013.01); *B01D 2315/08* (2013.01); *B01D 2315/20* (2013.01); *B01D 2317/04* (2013.01); *B01D 2319/04* (2013.01); *B01D 2321/04* (2013.01); *C02F 2303/16* (2013.01)
(58) Field of Classification Search
  CPC ........... B01D 2315/20; B01D 2317/04; B01D 2319/04; B01D 2321/04; B01D 61/14; B01D 61/18; B01D 61/22; B01D 63/043; B01D 65/02; B01D 63/04; B01D 61/00; B01D 61/145; B01D 61/147; B01D 65/08; B01D 63/00; B01D 63/031; C02F 1/444; C02F 2303/16; C02F 1/44
  See application file for complete search history.

(56) References Cited

U.S. PATENT DOCUMENTS

| | | | | |
|---|---|---|---|---|
| 2012/0094361 | A1* | 4/2012 | Hu | .................. B01D 65/02 |
| | | | | 435/257.1 |
| 2015/0090663 | A1* | 4/2015 | Gruett | .................. B01J 49/85 |
| | | | | 210/673 |
| 2016/0083273 | A1* | 3/2016 | Liberman | ............... C02F 1/445 |
| | | | | 210/636 |
| 2016/0244339 | A1* | 8/2016 | Reeves | .................. C02F 1/442 |
| 2017/0266622 | A1* | 9/2017 | Ito | ..................... B01D 65/02 |
| 2017/0282126 | A1* | 10/2017 | Nakamoto | ........... B01D 63/024 |
| 2018/0028980 | A1* | 2/2018 | Ikeda | .................. B01F 5/04 |
| 2018/0037473 | A1* | 2/2018 | Cote | .................. B01D 65/10 |

FOREIGN PATENT DOCUMENTS

| | | | |
|---|---|---|---|
| JP | H06277664 | A | 10/1994 |
| JP | 2005081168 | A | 3/2005 |
| JP | 2007245083 | A | 9/2007 |
| JP | 2008229471 | A | 10/2008 |
| KR | 100503783 | B1 | 7/2005 |
| WO | 97/47375 | A1 | 12/1997 |
| WO | WO-9747375 | A1 * | 12/1997 ........... B01D 63/043 |
| WO | 03/051497 | A1 | 6/2003 |

OTHER PUBLICATIONS

PCT/EP2017/067443 International Search Report and Written Opinion dated Oct. 11, 2017 (11 p.).
Argentina Office Action dated Jul. 26, 2021, for Argentina Application No. P170102030 (9 p.).
English Summary of Argentina Office Action dated Jul. 26, 2021, for Argentina Application No. P170102030 (3 p.).

* cited by examiner

METHOD OF FILTERING WATER

CROSS-REFERENCE TO RELATED APPLICATIONS

This application is a 35 U.S.C. § 371 national stage application of PCT/EP2017/067443 filed Jul. 11, 2017 and entitled "Method of Filtering Water," which claims priority to GB Application No. 1612680.7 filed Jul. 21, 2016 and entitled "Method of Filtering Water," both of which are hereby incorporated herein by reference in their entirety for all purposes.

STATEMENT REGARDING FEDERALLY SPONSORED RESEARCH OR DEVELOPMENT

Not applicable.

BACKGROUND

The present invention relates to a method for removing suspended solids from water.

International patent application publication number WO 03/051497 relates to a membrane filter, comprising a housing with a feed inlet, a permeate outlet and at least two membrane filters provided in the housing, wherein a fluid to be filtered is fed via the feed inlet to the membrane filters, and a permeate stream is discharged via the permeate outlet and which is characterised in that one of the permeate outlet and the feed inlet is located at least at one end of the membrane filter housing and the other one is located at a position substantially in the middle of the membrane filter housing. According to the discussion of FIG. 4, during back-flushing, of the apparatus of FIG. 2, the back-flush of permeate is supplied near the permeate outlets 3, flows via the permeate conduit 5 through the membrane modules 4 and exits the apparatus via the feed inlet 2. Thus, the direction of flow is simply reversed.

International patent application publication number WO97/47375 relates to a membrane filtration system for filtering a liquid containing impurities using microfiltration or ultrafiltration membranes, comprising a pressure vessel containing two or more membrane filter elements, connected on the filtrate side by means of a connector, and which is closed off at both ends with an end plate, wherein in one or both end plates connections are arranged for discharging filtrate or feeding back-flush and/or cleaning and/or disinfecting liquid, and wherein at both ends of the pressure vessel, either in the end plates or in the side wall of the pressure vessel connections are arranged for feeding the liquid to be filtered or discharging the back-flush and/or cleaning and/or disinfecting liquid and impurities. The membrane filter system of WO 97/47375 is characterized in that in the side wall of the pressure vessel between the connections at the outer ends of the pressure vessel one or more additional connections are arranged for feeding the liquid to be filtered or discharging the back-flush and/or cleaning and/or disinfecting liquid and impurities. The flows which occur with the membrane filtration system are shown in FIG. 4 of WO 97/47375. The liquid to be filtered is supplied via the end connections and additional connections. The liquid to be purified then passes into the membrane filter elements and flows axially through the membrane filter elements. The filtrate flows through the membrane and subsequently into a filtrate discharge tube and leaves the pressure vessel via the connections. The impurities remain behind in the membrane filter elements. The pressure vessel is periodically back-flushed to remove the accumulated impurities by reversing the flow direction. The back-flush liquid is fed via the connections in the end plates. The back-flush liquid flows through the membrane and subsequently axially through the membrane filter elements. The back-flush liquid containing the impurities leaves the pressure vessel via the connections and the additional connections. However, it has now been found that the back-flush method of WO 97/47375 may not be efficient in removing impurities from the internal surface of the hollow fibres.

SUMMARY

In a first embodiment, the present invention relates to a method of operating a filtration unit comprising a filtration vessel containing at least one dead-end filtration element, the or each filtration element comprised of a plurality of hollow fibre microfiltration or ultrafiltration membranes wherein each hollow fibre has a first inlet and a second inlet at a first end and a second end thereof in fluid communication with the inside of the hollow fibre and the filtration element(s) has an outlet at one of the first and second ends thereof in fluid communication with the outside of the hollow fibres; characterized in that:

during filtration, feed water containing suspended particulate material is fed simultaneously to the inside of the hollow fibres through the first inlets and second inlets thereof and filtrate is removed from the outside of the hollow fibres through the outlet of the filtration element(s); and during back-washing, back-wash water is fed to the outside of the hollow fibres through the outlet of the filtration element(s) and, in a first back-wash cycle, back-wash water containing entrained particulate material is discharged from the inside of the hollow fibres through the first inlets thereof; and, in a second back-wash cycle, back-wash water containing entrained particulate material is discharged from the inside of the hollow fibres through the second inlets thereof.

The first and second back-wash cycles for the filtration element may be performed sequentially in either order.

Although the filtration element(s) may have a single outlet, it is preferred that the filtration element(s) has a first outlet and a second outlet arranged at the first and second ends respectively thereof. Accordingly, during filtration, filtrate is removed from the outside of the fibres simultaneously from both the first and second outlets of the filtration element.

It is envisaged that during back-washing, in a first back-wash cycle, back-wash water may be fed to the outside of the hollow fibres through the first outlet of the filtration elements and back-wash water containing entrained particulate material may be discharged from the inside of the hollow fibres through the first inlets thereof; and, in a second back-wash cycle, back-wash water may be fed to the outside of the hollow fibres through the second outlet of the filtration element and back-wash water containing entrained particulate material may be discharged from the inside of the hollow fibres through the second inlets thereof. Again, the first and second back-wash cycles may be performed in either order.

In a second embodiment, the present invention relates to a filtration unit comprising a filtration vessel containing at least one dead-end filtration element, the or each filtration element comprised of a plurality of hollow fibre microfiltration or ultrafiltration membranes wherein each hollow fibre has a first inlet and a second inlet at the first and second ends thereof in fluid communication with the inside of the hollow fibre and the filtration element(s) has an outlet at one of the first and second ends thereof in fluid communication with the outside of the hollow fibres; characterized in that:

(i) the first inlets of the hollow fibres of the filtration element(s) are in fluid communication with a first dedicated feed line via a first dedicated feed port in the filtration vessel and the second inlets of the hollow fibres of the filtration element(s) are in fluid communication with a second dedicated feed line via a second dedicated feed port in the filtration vessel;

(ii) the outlet of the filtration element(s) is in fluid communication with a filtrate line via a filtrate port in the filtration vessel;

characterized in that the first and second dedicated feed lines and the filtrate line each have a valve provided with an actuator wherein the actuators are independently actuatable to move the valves between an open and closed position; and, (a) during filtration, the actuators move the valves on the first dedicated feed line, the second dedicated feed line and the filtrate line to open positions such that feed water containing suspended particulate material is fed simultaneously to the inside of the hollow fibres from the first and second dedicated feed lines via the first and second dedicated feed ports respectively and through the first and second inlets of the hollow fibres respectively and filtrate is removed from the outside of the fibres and is discharged to the filtrate line through the outlet of the filtration element(s) and the filtrate port; and, (b) during back-washing, the filtration element(s) is back-washed in two cycles by the actuators opening and closing the valves on the flow lines in sequence such the valve on the filtrate line is in an open position and back-wash water is fed from the filtrate line to the outside of the fibres through the outlet of the filtration element(s) via the filtrate port and, in a first back-wash cycle, the valves on the first and second dedicated feed lines are in open and closed positions respectively and back-wash water containing entrained particulate material is removed from the inside of the hollow fibres through the first inlets of the fibres via the first dedicated feed port and is discharged to the first dedicated feed line(s); and, in a second back-wash cycle, the valves on the first and second dedicated feed lines are in closed and open positions respectively and back-wash water containing entrained particulate material is removed from the inside of the hollow fibres through the second inlets of the fibres via the second dedicated feed port and is discharged to the second dedicated feed line.

Although the filtration element(s) may have a single outlet it is preferred that the filtration element(s) has a first outlet and a second outlet arranged at the first and second ends respectively of the filtration element(s).

Suitably, the first and second outlets of the filtration element(s) may be in fluid communication with a dedicated first filtrate line and a dedicated second filtrate line respectively via dedicated first and second filtrate ports respectively in the filtration vessel. Valves on each of the dedicated first and second filtrate lines are provided with actuators that are independently actuatable to move the valves between an open and closed position. During filtration, the valves on the first and second dedicated feed lines and on the first and second dedicated filtrate lines are in open positions.

The filtration element(s) may be back-washed in two cycles. In a first back-wash cycle, the valves on the dedicated first filtrate line and dedicated first feed line may be in open positions and the valves on the dedicated second filtrate line and dedicated second feed line may be in closed positions such that back-wash water is fed to the outside of the hollow fibres from the dedicated first filtrate line through the first outlet of the filtration element(s) via the dedicated first filtrate port and back-wash water containing entrained particulate material is removed from the inside of the hollow fibres through the first inlets thereof and is discharged to the dedicated first dedicated feed line via the dedicated first feed port; and, in a second back-wash cycle, the valves on the dedicated first filtrate line and dedicated first feed line are in closed positions and the valves on the dedicated second filtrate line and dedicated second feed line are in open positions such that back-wash water is fed to the outside of the fibres through the dedicated second outlet of the filtration element(s) from the dedicated second filtrate line via the dedicated second filtrate port and back-wash water containing entrained particulate material is removed from the inside of the hollow fibres through the second inlets at the second end thereof and is discharged to the second dedicated feed line via the second dedicated feed port.

The first and second back-wash cycles for each filtration element(s) may be performed sequentially in either order.

It is to be understood that where there are two or more filtration elements arranged in a filtration vessel, that each filtration element may have a dedicated first filtrate line and a dedicated second filtrate line and each filtration element may be back-washed as described above.

Alternatively, the filtration elements may be arranged in series such that there is a first filtrate line and second filtrate line in fluid communication with an outlet of the first filtration element and with an outlet of the last filtration element respectively in the series of filtration elements. Back-washing of this arrangement of filtration elements is described in more detail below.

DEFINITIONS

Figure 1:
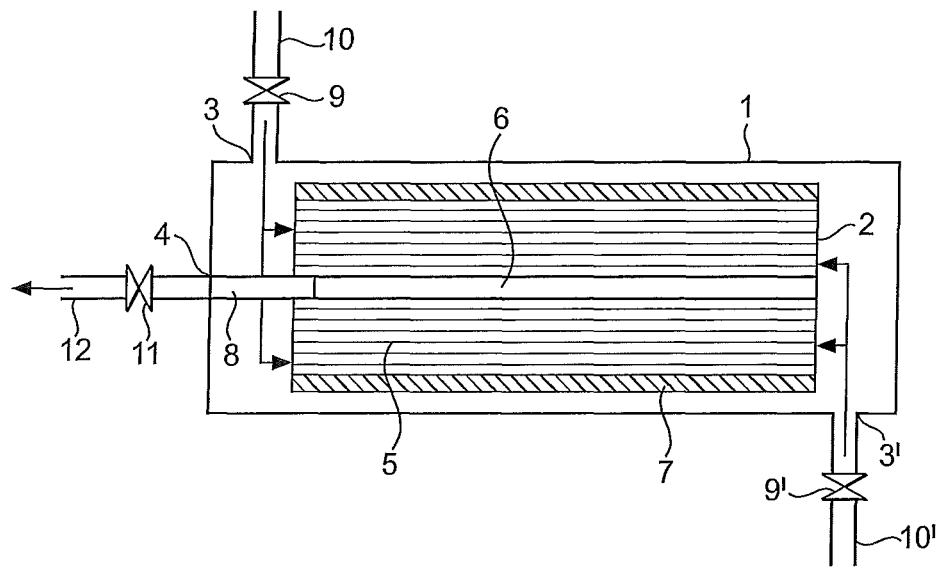
FIG. 1 shows a filtration unit according to a first embodiment of the invention during filtration.

Throughout the following description the following terms are referred to:

"Feed water" is a water containing suspended particulate material.

"Back-wash water" is typically a portion of the filtrate.

"Filtrate" is the water that passes through the membrane(s) of the filtration element(s) during filtration of the feed water.

"Flux" is the amount of filtrate produced per unit area of membrane surface per unit time. Generally flux is expressed as litres per meter per hour (lmh).

"Dead-end filtration unit" is a filtration unit comprising at least one filtration element comprised of a plurality of membranes in which all the water to be filtered (containing suspended particulate material) passes through the membrane such that the particulate material accumulates on the surface of the membrane at the feed side of the membrane. In a dead-end filtration unit, the accumulated particulate material is discharged from the filtration element by periodical back-washing of the filtration element(s) with filtrate (referred to herein as "back-wash water"). Additives for chemically cleaning and/or disinfecting the membrane of the filtration element may be added periodically or continuously to the back-wash water.

"Hollow fibre filtration element" is a filtration element comprising a plurality of hollow fibre membranes (often referred to in the art as a "bundle"). Typically, the hollow fibre membranes (hereinafter referred to as "hollow fibres") are arranged in parallel in the annular space formed between a central perforated pipe or tube and an outer cylindrical sleeve of the filtration element. Typically, the hollow fibres have first and second open ends, sealed in first and second terminal end pieces of the filtration element. These first and second open ends are the first and second inlets of the fibres. The inside of each hollow fibre (i.e., the interior space surrounded by the internal wall of each hollow fibre) is the feed side of the membrane and the outside of the hollow fibres (exterior space around the hollow fibres) is the filtrate side of the membrane. Thus, the wall of each hollow fibre comprises the microfiltration or ultrafiltration membrane. During filtration or during back-washing of the filtration element, the exterior space around the hollow fibres is in fluid communication with the interior of the central perforated pipe. During filtration, filtrate leaves the filtration element via at least one open end of the central perforated pipe. During back-washing, filtrate enters the filtration element via the at least one open end of the central perforated pipe.

"Particulate material" is insoluble particles suspended in the feed water and includes colloidal sized particles.

"Inside-to-outside flow path" is when, during filtration, the flow of filtrate through the membrane is from the feed side (inside of the hollow fibres) to the filtrate side (outside of the hollow fibres) of the filtration element. In the method of the present invention, feed water passes axially into the interior space of the hollow fibres simultaneously from both the first and second open ends (first and second inlets) of the hollow fibres and filtrate passes through the walls of the fibres to the exterior space around the fibres.

"Outside-to-inside flow path" is when, during back-washing, the flow of back-wash water through the membrane is from the filtrate side (outside of the hollow fibres) to the feed side (inside of the hollow fibres) of the filtration element. Back-wash water passes from the exterior space around the fibres through the walls of the fibres and then axially through the interior space of the hollow fibres. In the method of the present invention, back-wash water containing entrained particulate material is removed, in a first back-wash cycle, from the first open ends (first inlets) of the fibres and, in a second back-wash cycle, from the second open ends (second inlets) of the fibres. These first and second back-wash cycles may be performed sequentially in either order.

Ultrafiltration (UF) and microfiltration (MF) are membrane filtration processes used to remove suspended (dispersed) particulate material from a feed water using UF and MF membranes respectively.

UF and MF membranes both comprise first and second layers wherein the first layer is a discriminating layer that excludes suspended particulate material from passing through the membrane and the second layer is a porous supporting medium that provides strength to the membrane. UF membranes typically have discriminating layers with pore sizes that exclude particulate material having a particle size of 0.01 to 0.001 microns or greater. MF membranes typically have a discriminating layer with pore sizes that exclude particulate material having a particle size of 0.1 to 10 µm or greater. Accordingly, UF membranes exclude finer particulate material than MF membranes. UF membranes (at 0.01 micron cut-off) are recognized as an effective barrier to microorganisms such as bacteria. UF membranes also exclude macromolecular organic species, in particular macromolecular organic species with molecular weights of 150,000 Daltons or greater. This significantly reduces the risk of biogrowth on the membranes of any reverse osmosis or nanofiltration membrane units arranged downstream of the UF unit(s).

A filtration unit typically comprises a filtration vessel containing one or more filtration elements. Typically, the filtration vessel is a cylindrically shaped filtration vessel having a cylindrical wall (i.e., a cylinder), and first and second end caps arranged at first and second ends of the cylinder. Preferably, the first and second end caps are removable thereby allowing servicing and replacement of filtration elements. Ports in the filtration vessel may be located either in the cylindrical wall or in the removable end caps.

A rack is a group of filtration units that share common valving. A bank is a group of filtration vessels that form part of a rack that can be isolated as a group for back-washing or cleaning. A single rack or two or more racks may be mounted on a skid.

DETAILED DESCRIPTION

Further features and advantages of the invention will become apparent from the following description of preferred embodiments of the invention.

The filtration vessel may contain a single filtration element. Where the filtration vessel contains a single filtration element, first and second feed ports are arranged in the filtration vessel at or near the first and second ends thereof. A single filtrate port may be arranged in the filtration vessel at or near one of the first and second ends thereof. Preferably, a first and a second filtrate port are arranged in the wall of the filtration vessel at or near the first and second ends thereof. Typically, the single filtration element is arranged in the filtration vessel between the feed and filtrate ports.

Figure 3:
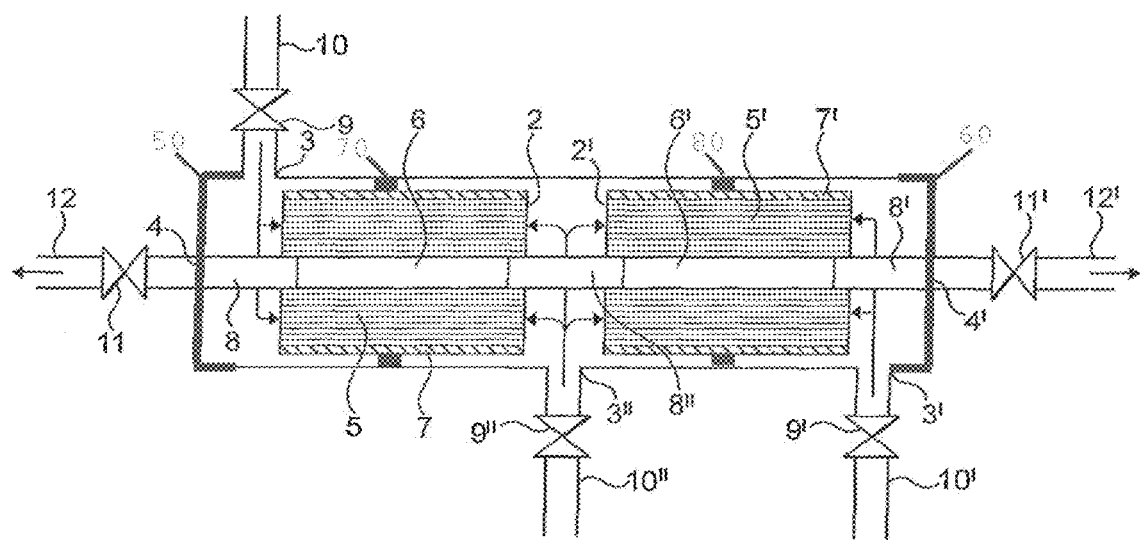
FIG. 3 shows a filtration unit according to a second embodiment of the invention during filtration.
Figure 4:
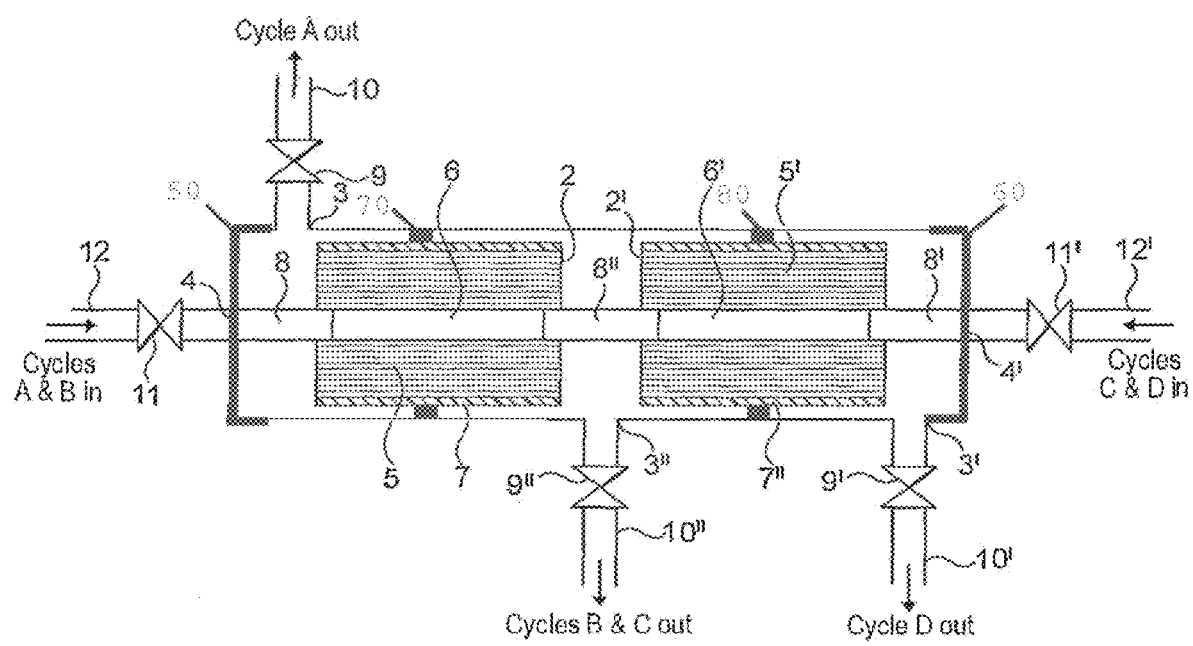
FIG. 4 shows a filtration unit according to a second embodiment of the invention during back-washing.

Preferably, the filtration vessel may contain a plurality of filtration elements arranged in a row (or series) with spaces or gaps between the adjacent filtration element(s) and spaces or gaps between the terminal filtration elements (first and last filtration elements in the row) and the first and second end caps 50 and 60 of the filtration vessel 1, as depicted in FIGS. 3 and 4. Suitably, the filtration vessel may contain from 2 to 12 filtration elements, preferably, from 2 to 8, more preferably, from 2 to 6, for example, from 2 to 4 filtration elements. Where the filtration vessel contains a plurality of filtration elements, first and second feed ports are typically arranged in the filtration vessel at or near the first and second ends thereof (hereinafter referred to as "end feed ports"). One or more additional feed ports are arranged in the wall of the filtration vessel (hereinafter referred to as "side feed ports") with a single filtration element arranged on either side of each side feed port. Thus, where there are two filtration elements, there is a single additional side feed port at a central position in the wall of the filtration vessel with the filtration elements arranged on either side thereof. The first and second end feed ports are connected either directly or indirectly to first and second dedicated feed lines. Similarly, the or each side feed port is connected either directly or indirectly to a dedicated feed line (hereinafter referred to as "side feed line(s)") (i.e. there is a dedicated side feed line for each side feed port). A single filtrate port may be arranged in the filtration vessel at or near one of the first and second ends thereof (hereinafter referred to as an "end filtrate port"). The single end filtrate port may be connected either directly or indirectly to a filtrate line. Preferably, a first and a second end filtrate port are arranged in the filtration vessel at or near the first and second ends thereof. The first and second end filtrate ports may be connected either directly or indirectly to dedicated first and second filtrate lines. Optionally, one or more additional filtrate ports may be arranged in the wall of the filtration vessel (hereinafter referred to as a "side filtrate port"). The or each side filtrate port may be connected either directly or indirectly to a dedicated filtrate line (hereinafter referred to as "side filtrate line(s)").

Where the filtration vessel contains a single filtration element, the filtration element is back-washed using a first and a second back-wash cycle (i.e., two back wash cycles) that may be performed sequentially in either order.

Where the filtration vessel contains a plurality of filtration elements, there are first and second back-wash cycles for each of the plurality of filtration elements (i.e., two back wash cycles per filtration element). The back-wash cycles for the plurality of filtration elements contained in the filtration vessel may be performed sequentially in any order. It is also envisaged that the first back-wash cycles for each of the plurality of filtration elements contained in the filtration vessel may be performed simultaneously such that back-wash water containing entrained suspended solids is removed simultaneously from the first inlets of the plurality of hollow fibres (hereinafter "bundle of hollow fibres") of each of the plurality of filtration elements. Similarly, the second back-wash cycles for each of the plurality of filtration elements contained in the filtration vessel may be performed simultaneously such that back-wash water containing entrained suspended solids is removed simultaneously from the second inlets of the bundle of hollow fibres of each of the plurality of filtration elements. These simultaneous first and second back-wash cycles for the filtration elements may be performed in either order (i.e. the first back-wash cycles before the second back-wash cycles or vice versa).

Where the filtration vessel contains four or more filtration elements, for example 4 to 12 filtration elements, the filtration elements may also be back-washed in two or more subsets, for example, in subsets of two or three filtration elements. The subsets may be back-washed sequentially (successively) in any order. For example, in the case of two subsets, the back-wash cycles for the filtration elements of the first subset may be completed before the back-wash cycles for the filtration elements of the second subset (or vice versa). It is to be understood that the back-wash cycles for the individual filtration elements of each subset of filtration elements may be carried out sequentially in any order. Alternatively, the first back-wash cycles for the individual filtration elements of each subset may be performed simultaneously. Similarly, the second back-wash cycles for the individual filtration elements of each subset may be performed simultaneously.

Preferably, the filtration unit comprises a cylindrical filtration vessel containing at least one cylindrical filtration element, preferably, a plurality of filtration elements. As discussed above, the cylindrical filtration vessel typically comprises a cylinder having first and second end caps at first and second ends thereof. Where the cylindrical filtration vessel has first and second end feed ports and first and second end filtrate ports, the first and second end filtrate ports are preferably arranged in the first and second end caps respectively and the first and second end feed ports are preferably arranged at or near the first and second ends of the cylinder respectively. However, it is also envisaged that the first and second end feed ports may be arranged in the first and second end caps respectively and the first and second end filtrate ports may be arranged at or near the first and second ends of the cylinder respectively.

Suitably, the cylindrical filtration vessel has a length in the range of about 40 to 475 inches (1.0 to 12.1 metres), preferably 80 to 400 inches (2.0 to 10.2) metres. Suitably, the cylindrical filtration vessel has an internal diameter in the range of 4 to 20 inches (0.10 to 0.51 metres), for example, an internal diameter of 4, 6, 8, 9, or 16 inches (0.10, 0.15, 0.20, 0.23 and 0.41 metres).

Preferably, the filtration unit comprising the cylindrical filtration vessel is arranged horizontally with the longitudinal axis through the cylindrical filtration vessel in a substantially horizontal plane.

Typically, the or each hollow fibre filtration element is also cylindrical. As discussed above, the plurality of hollow fibres (bundle of hollow fibres) are typically arranged in the annular space formed between the central perforated tube and the outer cylindrical sleeve with the longitudinal axes of the fibres substantially parallel to the longitudinal axes of the central perforated tube and the outer cylindrical sleeve. Preferably, each individual hollow fibre has a diameter of from 0.2 to 2 mm. The hollow fibre filtration element(s) typically has a length of from 10 inches to 84 inches (0.25 to 2.13 metres), for example, a length of 10, 24, 60 or 84 inches (0.25, 0.61, 1.02, 1.52 and 2.13 metres) with the hollow fibres extending between the first and second ends of the element(s). Generally, the element(s) has a diameter slightly smaller than the internal diameter of the cylindrical filtration vessel thereby achieving a water tight fit with the internal wall of the cylindrical filtration vessel. If necessary, annular seals 70 and 80, as depicted in FIGS. 3 and 4, are provided in the annular space between the outer wall of the cylindrical sleeve of the filtration element(s) and the inner wall of the cylindrical filtration vessel to prevent feed water from flowing around the outside of the filtration element(s).

First and second terminal end pieces are provided at the first and second ends of the bundle of hollow fibres of the or each filtration element wherein the end pieces are typically formed from a hardened polymeric material, for example a hardened epoxy resin. The exterior surfaces of the first and second the terminal end pieces are characterized by a plurality of open ends of the hollow fibres while the hardened polymeric material forms a fluid seal about the exterior terminal portions of the hollow fibres. Thus, the open ends of the hollow fibres in the exterior surfaces of the first and second terminal end pieces correspond to the first and second inlets respectively of the filtration element(s).

Suitably, the central perforated tube of the hollow fibre filtration element(s) has either a single open end (outlet) at one of the first and second ends thereof, or, preferably, a first and second open end at the first and second ends thereof respectively (first and second outlets respectively). Where the central perforated tube has a single open end, the other end of the tube is closed, for example, by means of an end plate. In use, the central perforated tube is in fluid communication with the exterior space around the outside of the hollow fibres. The central perforated tube of the filtration element(s) is also connected to at least one filtrate port arranged in the filtration vessel (either in the wall of the filtration vessel or in an end cap). Where the central perforated tube has a single open end, it is typically connected, either directly or indirectly, to a single filtrate port. Where the central perforated tube has first and second open ends, typically, the first open end is connected, either directly or indirectly, to a first filtrate port and the second open end is connected, either directly or indirectly to a second filtrate port.

During filtration, feed water containing suspended particulate material is fed simultaneously to the first and second inlets (first and second open ends) of the hollow fibres of the or each filtration element. Filtrate passes through the walls of the hollow fibres and is removed from the or each hollow fibre filtration element through the open end(s) of the central perforated tube. Accordingly, during filtration, the flow path for the filtrate is from the inside to the outside of the hollow fibres.

The inside-to-outside flow path for the hollow fibre filtration element(s) during filtration has an advantage over an outside-to-inside flow path in that flow of filtrate through the open space of the body of the element is not subjected to the pressure losses associated with flow of filtrate through the interior of the fibres.

The person skilled in the art will understand that the pressure inside the hollow fibres reduces with increasing distance from the first and second inlets (first and second open ends) of the fibres such that the pressure is lowest towards the middle of the fibres. The membrane flux is driven by the local pressure differential across the membrane ("trans-membrane pressure differential") and equals the pressure inside the fibres minus the filtrate counter-pressure. Due to pressure losses along the interior of the fibres, the trans-membrane pressure is highest at or near the first and second inlets (first and second open ends) of the fibres and lowest at or near the middle of the fibres. The local pressure differential across the membrane results in an irregular membrane flux (with the flux decreasing with decreasing trans-membrane pressure differential) such that, in the method of the present invention, fouling is heaviest near the first and second open ends of the fibres. Fouling of the internal surface of the fibres (owing to deposition of particulate material) results in a decrease in the membrane flux such that a first and second effective filtration zone migrates along the fibres from the first and second open ends (first and second inlets) of the fibres respectively. However, owing to the reduction in trans-membrane pressure differential, as the first and second effective filtration zones migrate along the fibres, the flux through the membrane progressively decreases such that the hollow fibre membrane become less productive with increasing levels of fouling.

However, feeding the feed water containing suspended particulate material simultaneously to both the first and second open ends of hollow fibres has an advantage of extending the time period of the filtration cycle (compared with introducing feed water through a single end of the fibres). Typically, feeding the feed water into the fibres simultaneously through both the first and second open ends of the fibres extends the time period of the filtration cycle by at least 10%, preferably by at least 20% compared with feeding the feed water through a single open end of the fibres (at the same feed pressure). Thus, a filtration cycle for a filtration element in which feed water is fed to a single open end of the fibres is typically in the range of 30 to 45 minutes, preferably, 35 to 45 minutes while the filtration cycle for a filtration element in which feed water is fed simultaneously through both the first and second open ends of the fibres may be in the range of 35 to 60 minutes, preferably, 45 to 60 minutes, in particular, 50 to 60 minutes.

During filtration, the filtration vessel may be operated with a relatively low pressure for the feed water in the range of 2 to 10 bar gauge, preferably, 2 to 7.5 bar gauge, in particular, 2.5 to 3.5 bar gauge. This is because feeding water to both the first and second open ends of the hollow fibres of the or each filtration element minimizes pressure drop along the fibres and also increases the particulate loading of the hollow fibres before they require back-washing (when compared with feeding water from only one end of the fibres). Typically, during filtration, the filtration vessel may be operated with a flow rate of feed water to the first inlets and to the second inlets (first and second open ends) of the hollow fibres of the or each filtration element in the range of 1.4 to 2.5 m$^3$/hour.

However, the irregular fouling of the membrane and the irregular membrane flux during filtration results in a problem that when back-washing, by reversing the flow through the membrane, not all the interior surface of the hollow fibres of the filtration elements will be back-washed equally well. This may have a negative effect on the productivity of the filtration unit.

The back-washing method of the present invention comprises removing back-wash water containing entrained particulate material in a first back-wash cycle from the first inlets (first open ends) of the bundle of hollow fibres of the filtration element(s) and, in a second back-wash cycle, from the second inlets (second open ends) of the bundle of hollow fibres of the filtration element(s) wherein the first and second back-wash cycles are performed sequentially in either order. In both back-wash cycles, the flow path for the back-wash water is from the outside to the inside of the hollow fibres.

The outside-to-inside flow path during back-washing of the hollow fibre filtration element(s) results in the back-wash water passing through the membrane from the exterior (outside) to the interior (inside) of the fibres and particulate material deposited on the interior surface of the fibres during filtration being lifted off the surface and becoming entrained in the back-wash water. When compared with simply reversing the flow through the filtration element(s), removing back-wash water contained entrained particulate material from the first ends of the fibres and subsequently from the second ends of the fibres (or vice versa) results in:

(1) Improved entrainment of particulate material in the back-wash water; and
(2) Reduced peak demand for back-wash water.

The sequential (or successive) back-washing cycles used in the method of the present invention also allow the size of the tank for the filtrate (a portion of which is used as back-wash water) to be reduced. A reduction in size of the filtrate tank is of particular importance when the filtration units are located offshore on a vessel or platform as this reduces weight and space requirements for the filtration system (wherein the filtrate system is comprised of a filtrate tank and a plurality of filtration units).

Where the cylindrical filtration vessel contains a single hollow fibre filtration element, at least one end of the central perforated tube of the hollow fibre filtration element is in fluid communication, either directly or indirectly, with a filtrate line via a filtrate port located in either the cylindrical wall (cylinder) of the filtration vessel at or near one of the first and second ends thereof or in one of the first and second end caps. Preferably, the first end of the central perforated tube of the hollow fibre element is in fluid communication, either directly or indirectly, with a first filtrate port and the second end of the central perforated port is in fluid communication, either directly or indirectly, with a second filtrate port arranged at or near the first and second ends of the filtration vessel respectively (hereinafter referred to as "first and second end filtrate ports"). It is to be understood that, during filtration, filtrate is discharged from the filtration vessel into the filtrate line(s) through the filtrate port(s) and from the filtrate line(s) to the filtrate tank; and, during back-washing, back-wash water is fed from the filtrate tank to the filtrate line(s) and through the filtrate port(s) into the filtration vessel.

Where a cylindrical filtration vessel contains a plurality of cylindrical hollow fibre filtration elements, the filtration elements may be arranged spaced apart in a row along the length of the cylindrical filtration vessel. Accordingly, there are first and second terminal filtration elements arranged at first and second terminal positions in the cylindrical filtration vessel (i.e., at the first and second ends thereof) and, optionally, one or more additional filtration elements arranged at intermediate positions in the filtration vessel. Feed ports are arranged in the filtration vessel (in either the cylindrical wall of the filtration vessel or in an end cap) at or near the first and second ends respectively thereof (hereinafter referred to as "first and second end feed ports") and one or more additional feeds ports (hereinafter referred to as "side ports") are arranged in the cylindrical wall of the filtration vessel with a single filtration element arranged on either side of each side port. Each of the first and second end feed ports and the side feed port(s) are connected either directly or indirectly to dedicated feed lines (i.e. a dedicated feed line is provided for each of the feed ports). This arrangement allows feed water to be introduced simultaneously from the feed lines through the feed ports to the first and second inlets of each of the hollow fibre filtration elements.

Preferably, first and second filtrate ports are arranged at or near the first and second ends of the cylindrical filtration vessel respectively (hereinafter referred to as "first and second end filtrate ports") and are connected either directly or indirectly to first and second filtrate lines. The first and second end filtrate ports may be arranged in either the wall of the filtration vessel or in the first and second end caps respectively, preferably, in the end caps. The first and second end filtrate ports may be connected to the terminal ends of the central perforated tubes of the first and second terminal filtration elements respectively via first and second connector pipe members respectively. Suitably, the central perforated tubes of adjacent filtration elements may be joined together by a connector pipe member such that, during filtration, filtrate flows through the central perforated tubes of the plurality of filtration elements via the connector pipe members to the first and second end filtrate ports where the filtrate is discharged into the first and second filtrate lines respectively. During back-washing, back-wash water is fed from the first and second filtrate lines, through the first and second filtrate ports to the central perforated tubes of the filtration elements via the connector pipe members.

Optionally, the connector pipe member(s) for joining adjacent filtration elements may be a T-piece connector pipe member(s) having a main pipe that connects between the central perforated tubes of the adjacent filtration elements and a branch pipe that connects with an additional filtrate port(s) arranged in the wall of the filtration vessel ("side filtrate port"). The side filtrate port(s) is connected either directly or indirectly to a dedicated filtrate line(s). Alternatively, the central perforated tube of each filtration element may be closed at one end, for example, with an end plate and at its other end may be connected to a dedicated filtrate port in the cylindrical vessel via a connector pipe member. Each of the dedicated filtrate ports are connected either directly or indirectly to a dedicated filtrate line.

The connector pipe members are required to separate the filtrate from the feed water during filtration or to separate the back-wash water from the back-wash water containing entrained particulate material (i.e., a back-wash reject) during back-washing. Accordingly, perforations are omitted from the connector pipe members. During filtration, the feed water is on the outside of the connector pipe members. During back-washing, the back-wash water contained entrained particulate material (the back-wash reject) is on the outside of the connector pipe members. It is to be understood that the feed lines and filtrate lines referred to above are each provided with a valve and an actuator for the valve such that the valves on the feed lines and filtrate lines may be independently moved between an open and a closed position.

In one embodiment of the present invention, there are first and second hollow fibre filtration elements arranged in a cylindrical filtration vessel having first and second end caps, with the first filtration element on the left and the second filtration element on the right of a side feed port. The side feed port is arranged centrally in the wall of the filtration vessel. In this arrangement, the filtration vessel also has first and second end feed ports arranged at or near the left and right ends of the filtration vessel respectively (referred to below as "first feed port" and "second feed port" respectively). Typically, the filtration vessel has first and second filtrate ports arranged at or near the left and right ends of the cylindrical filtration vessel respectively (referred to below as "first filtrate port" and "second filtrate port" respectively). The first and second filtrate ports are generally arranged in the first and second end caps respectively of the filtration vessel. Typically, a pipe connector member connects between the central perforated tube of the first and second filtration elements. The terminal ends of the perforated tubes of the first and second filtration elements may be connected via pipe connector members to the first and second filtrate ports respectively. The first and second feed ports are connected either directly or indirectly to first and second feed lines respectively while the side feed port is connected either directly or indirectly to a central feed line. The first and second filtrate ports are connected either directly or indirectly to first and second filtrate lines respectively. Each of the feed lines and filtrate lines are provided with a valve. The valves on the feed lines and on the filtrate lines are each provided with an actuator that are independently actuatable to move the valves between an open and closed position.

During filtration, the valves on the feed lines and filtrate lines are in open positions (i.e., the actuators have moved each of the valves to an open position) such that feed water is fed from the first, second and central feed lines into the filtration vessel through the first feed port, second feed port and side feed port respectively and filtrate is discharged into the first and second filtrate lines through the first and second filtrate ports respectively.

During back-washing, the actuators move the valves on the feed lines and filtrate lines in sequence between open and closed positions to provide four back-wash cycles (two back-wash cycles for each filtration element) which may be performed sequentially in any order:

1. In Cycle A, the back-wash water (a portion of the filtrate) is fed from the first filtrate line through the first filtrate port to the central perforated tube of the first filtration element and back-wash water containing entrained particulates (back-wash reject) is removed from the open ends of the hollow fibres at the left end of the first filtration element (i.e., first ends) and is subsequently discharged into the first feed line through the first feed port (i.e., the valves on the first filtrate line and first feed line are in an open position and the remaining valves are in a closed position);

2. In Cycle B, the back-wash water (a portion of the filtrate) is fed from the first filtrate line through the first filtrate port to the central perforated tube of the first filtration element and back-wash water containing entrained particulates (back-wash reject) is removed from the open ends of the hollow fibres at the right end of the first filtration element (i.e., second ends) and is subsequently discharged into the central feed line through the side feed port (i.e., the valves on the first filtrate line and the central feed line are in an open position and the remaining valves are in a closed position);

3. In Cycle C, the back-wash water (a portion of the filtrate) is fed from the second filtrate line through the second filtrate port to the central perforated tube of the second filtration element and back-wash water containing entrained particulates (back-wash reject) is removed from the open ends of the hollow fibres at the left end of the second filtration element (i.e., first ends) and is subsequently discharged into the central feed line via the side feed port (i.e., the valves in the second filtrate line and the central feed line are in an open position and the remaining valves are in a closed position); and 4. In Cycle D, the back-wash water (a portion of the filtrate) is fed from the second filtrate line through the second filtrate port to the central perforated tube of the second filtration element and back-wash water containing entrained particulate (back-wash reject) is removed from the open ends of the hollow fibres at the right end of the second filtration element (i.e., second ends) and is discharged from the filtration vessel into the second feed line via the second feed port (i.e., the valves on the second filtrate line and second feed line are in an open position and the remaining valves are in a closed position).

Where there are more than two filtration elements (and therefore one or more additional side feed ports), there are an additional two back-washing cycles for each additional filtration element with the back-wash water containing entrained particulate material being removed, in a first cycle, from the first end of the additional filtration element(s) and subsequently, in a second cycle, from the second end of the additional filtration element(s) (or vice versa).

The actuators open and close the valves located on the flow lines in the correct sequence for each back-washing cycle in response to signals received from a controller. Thus, the sequential opening and closing of the valves during back-washing is performed automatically by the actuators. Suitably, the actuators may be electrical, hydraulic or pneumatic actuators. The controller may comprise control software which sends signals to the actuators to open and close the valves in a predetermined sequence.

Suitably, the time taken for each back-washing cycle is in the range of 10 to 60 seconds, preferably, 15 to 45 seconds, preferably about 15 to 20 seconds.

Preferably, back-washing of the filtration elements of each filtration unit occurs every 30 to 120 minutes, preferably, every 45 to 90 minutes, in particular, every 50 to 60 minutes.

In contrast, the back-wash cycle for a filtration element where the flow through the filtration element(s) is reversed such that back-wash water containing entrained particles is removed from both the first and second open ends (first and second inlets) of the fibres typically occurs every 35 to 45 minutes.

In the method of the present invention, the feed pressure of back-wash water (portion of the filtrate) during back-washing is typically in the range of 1.5 to 3.0 barg. Generally, the flow rate of back-wash water through the filtration element(s) during back-washing is in the range of 40 to 50 m$^3$/hour (per filtration element).

Performing two individual back-washing cycles per filtration element reduces the peak demand for back-wash water during back-washing of the filtration element(s) of a filtration unit (i.e., reduces the flow rate of back-wash water to the filtration unit). Where the filtration unit comprising a plurality of filtration elements, performing the back-wash cycles for each of the filtration elements of a filtration unit sequentially or performing the first back-wash cycles for a subset of the filtration elements simultaneously followed by the second back-wash cycles for the subset further reduces the peak demand for back-wash water during back-washing of the filtration elements of a filtration unit. Thus, the back-washing method of the present invention optimizes the feed pressure and peak flow rates of the back-wash water thereby achieving a higher longitudinal flow velocity through the interior of the fibres which enhances removal of particulates from the fibres in comparison with an outside to inside back-wash method in which there is reversal of flow during the back-wash cycle (with back-wash water containing entrained particle being removed simultaneously from both the first and second open ends (first and second inlets) of the hollow fibres).

The filtration units according to the second embodiment of the present invention may be arranged in one or more racks. Each filtration unit of a rack comprises a filtration vessel that contains at least one filtration element. The filtration units of a rack may be arranged in parallel in a plurality of rows. Typically, each row comprises from 2 to 10 filtration units, preferably, from 4 to 8 filtration units, for example, from 4 to 6 filtration units. Typically, each rack has from 2 to 20 rows, preferably, from 5 to 15 rows, in particular, from 10 to 12 rows. Where the filtration units comprise cylindrical filtration vessels, the filtration membrane units of each row are preferably arranged horizontally with the longitudinal axes of the cylindrical filtration vessels of each filtration unit of each row aligned in a substantially horizontal plane. In this case, the rows are arranged one above another.

Where the cylindrical filtration vessels of the rack(s) contain a plurality of filtration elements, each rack may have: a first feed header for feeding feed water to or for discharging back-wash water containing entrained particulate material from the first feed ports that are arranged at or near the first ends of the cylindrical filtration vessels; a second feed header for feeding feed water to or for discharging back-wash water containing entrained particulate material from the second feed ports that are arranged at or near the second ends of the cylindrical filtration vessels; and, one or more additional feed headers for feeding feed water to or for discharging back-wash water containing entrained particulate material from one or more side ports that are arranged in the wall of the cylindrical filtration vessels. As discussed above, adjacent filtration elements are arranged on either side of the or each side port in the side walls of the cylindrical filtration vessels. Each rack also has first and second filtrate headers for discharging filtrate from or for feeding back-wash water to first and second filtrate ports that are arranged at or near the first and second ends of the cylindrical filtration vessels respectively (typically, in first and second end caps respectively). Optionally, a rack may have one or more additional filtrate headers for discharging filtrate from or feeding back-wash water to one or more side filtrate ports in the cylindrical filtration vessels.

The first feed header, second feed header, the additional feed header(s), the first filtrate header, second filtrate header and any additional filtrate header(s) are typically arranged vertically (hereinafter referred to as a "set of vertical headers"). By "vertical headers" is meant that the longitudinal axes of the headers are substantially vertical. Accordingly, the vertical headers are substantially perpendicular to the horizontal rows of filtration units. Preferably, the first vertical feed header and the second vertical feed header are arranged at or near the first and second ends respectively of the cylindrical filtration vessels. Preferably, the first vertical filtrate header and second vertical filtrate header are arranged at or near the first and second ends respectively of the cylindrical filtration vessels. Preferably, the additional vertical feed header(s) is aligned with the side feed port(s) in the cylindrical filtration vessels. Where the cylindrical filtration vessel of each filtration unit has a single central side port with a first and second filtration element arranged on either side thereof, the rack has a single additional vertical feed header aligned with the central side ports of the cylindrical filtration vessels. Where the rack has an additional vertical filtrate header(s), the additional vertical header(s) is preferably aligned with the side filtrate port(s) in the filtration vessels.

Preferably, the vertical headers are arranged at a midpoint of the rack with a portion of the filtration units of each row arranged on either side thereof thereby forming a first and second bank of filtration units. Typically, each row of the first and second banks has two to four, preferably, two or three filtration units. Alternatively, a rack may comprise three or more banks of filtration units in which case there are one or more additional sets of vertical headers with a bank of filtration units arranged on either side of each set of vertical headers. Suitably, a common feed header may be in fluid communication with the feed headers of each set of vertical headers. Similarly, a common filtrate header may be in fluid communication with the filtrate headers of each set of vertical headers. The common filtrate header may also be in fluid communication with a filtrate tank which is typically raised above the upper row of the banks of filtration units.

Typically, each row of the rack may be provided with dedicated first feed lines, dedicated second feed lines and dedicated additional (side) feed lines for feeding feed water from the first feed header, second feed header and additional (side) feed header(s) respectively through the first feed ports, second feed ports and side feed ports respectively of the filtration vessels. However, it is also envisaged that the filtration units of each row of the rack may be linked together on the feed side of the hollow fibre membranes such that feed water is passed from a first filtration unit to a second filtration unit and any successive filtration unit(s) in the row. The filtration units may be linked together on the feed side of the hollow fibre membranes by connecting together end spaces of each filtration vessel (wherein an "end space" is a space or gap between a terminal filtration element and an end cap) and central spaces of each filtration vessel (wherein a "central space" is a space or gap between adjacent filtration elements) via feed connector members such that feed water flows, on the feed side of the membranes, from a first filtration vessel to a second filtration vessel and from the second filtration vessel to any successive filtration vessel(s) of the row. Advantageously, the filtration units of each row of the rack may be linked together on the feed side by connecting only the central spaces of each filtration vessel in which case dedicated first feed lines and dedicated second feed lines are provided from the first feed header and second feed header respectively for feeding feed water through the first and second end feed ports respectively of the filtration vessels.

Where the rack comprises a first and second bank of filtration units (to the left and right of a single set of vertical headers) separate feed lines may be provided for each row of each bank. Alternatively, where the rack comprises a first and second bank of filtration units, the filtration vessels of each row of each bank may be linked together on the feed side, as described above. Advantageously, where the rack comprises a first and second bank of filtration units, the filtration vessels arranged in each row of each bank may be linked together on the feed side by connecting only the central spaces of each filtration vessel such that feed water flows from the additional (side) feed header(s) successively through the filtration units of each row of each bank. In this case, dedicated first feed lines and dedicated second feed lines are also provided leading from the first feed header and second feed header to the first and second end ports respectively of the filtration vessels of each row of each bank.

Where the rack comprises a first and second bank of filtration units (to the left and right of a single set of vertical headers, the filtration units of each row of the first bank are typically provided with dedicated first filtrate lines and second filtrate lines into which filtrate is discharged from the filtration vessels through the first and second filtrate ports thereof respectively. The first and second filtrate lines subsequently discharge filtrate into the first and second vertical filtrate headers respectively. Similarly, the filtration units of each row of the second bank are also provided with dedicated first and second filtrate lines into which filtrate is discharged from the filtration vessels through the first and second filtrate ports thereof respectively. These further dedicated first and second filtrate lines subsequently discharge filtrate into the first and second filtrate headers respectively.

Suitably, the filtrate is discharged from the first and second filtrate headers of the or each set of headers into a common filtrate header and from this common filtrate header into a tank (hereinafter referred to as "filtrate tank") for holding filtrate (a portion of which is used as back-wash water) thereby allowing for surges in flow of filtrate. Thus, the filtrate tank is constantly being filled and emptied. Suitably, the filtrate tank has a capacity that matches the peak back-wash requirement for the rack(s) of filtration elements. Suitably, the filtrate tank is arranged above the upper row of the rack(s). Typically, the outlet of the filtrate tank is at least 30 metres, preferably, at least 35 metres above the inlets of the filtration units of the lowest row of the rack(s). Typically, the outlet of the filtrate tank is at least 25 metres above the inlets of the filtration units of the upper row of the rack(s). Raising the filtrate tank above the upper row of the rack(s) has the advantages of: (a) providing a static head pressure for the back-wash cycles and (b) ensuring that the filtration vessels and associated pipework remain liquid full during both the filtration and back-wash cycles. Suitably, the filtrate is boosted in pressure to a value that provides sufficient pressure to lift the filtrate through the common filtrate header into the filtrate tank. Preferably, the filtrate is boosted in pressure, for example, using a booster pump, to a value at least 0.3 bar above, preferably, 0.3 to 1.5 bar above the static head pressure at the inlet of the filtrate tank. Typically, the filtrate is boosted in pressure to a value in the range of 2.5 to 5 bar gauge.

Thus, it can be seen that a filtration system of the present invention may comprise at least one rack of filtration units, various flow lines, various headers and a filtrate tank.

It is to be understood that the horizontally stacked rows of filtration units of the filtration system of the present invention may be isolated individually. However, if the units are arranged in a rack having two or more banks, if desired, each bank of filtration units may be isolated independently of the other bank(s), or if the filtration system comprises two or more racks, if desired, each rack of filtration units may be isolated independently of the other rack(s).

This arrangement of horizontally stacked filtration units in one or more stacks (hereinafter referred to as "filtration system") has the following advantages:
  (a) Individual filtration units of the rack(s) may be readily isolated for inspection or maintenance; and
  (b) There is a higher "on-line" availability of filtration units owing to the ability to isolate individual units or groups of individual units when compared with prior art vertically arranged systems where vessels can typically only be isolated in groups.

The higher "on-line" availability of the filtration units ensures a consistent volume of filtrate for use as feed water to downstream reverse osmosis or nanofiltration units. Thus, the person skilled in the art would understand that a desalination plant comprising reverse osmosis units and optionally nanofiltration units or a sulfate reduction plant (SRP) comprising nanofiltration units requires a consistent volume of filtered feed water that is substantially free of suspended particulate solids. Thus, the filtration system of the present invention may be arranged upstream of a desalination plant or an SRP.

Preferably, the filtration units are arranged in two or more racks, each rack comprising a plurality of rows of horizontally stacked vessels (arranged one above another) with separate feed headers and filtrate headers for each rack. This allows the two or more racks to operate independently such that one or more racks may be filtering feed water while one or more racks are being back-washed with back-wash water.

It can be seen that the design of the rack(s) allows filtration elements located at the same positions in the filtration vessels to be back-washed simultaneously (with two back-wash cycles per filtration element position).

Advantageously, each filtration vessel of a rack has the same number of filtration elements such that the back-wash cycles for the filtration elements in the same positions in each of the filtration vessels of a rack may be performed simultaneously. For example, if there are two filtration elements arranged in each filtration vessel on either side of a central side port, any one of back-wash cycles A, B, C and D (discussed above) may be performed simultaneously for the each of the filtration vessels of the rack, and in any order.

Simultaneous back-washing of a set of elements located at the same element positions in the filtration vessels of an entire rack of filtration units (or of a bank of filtration units) decreases the "peak rate of flow" for the back-washing water (compared with simultaneous back-washing of all element positions of the filtration vessels of the rack) and optimizes the efficacy of the back-wash by focusing the back-wash water flow to a particular set of filtration elements. Simultaneous back-washing of a set of filtration elements located at the same positions in the filtration units, also provides the advantage of requiring a lower peak flow of back-wash water and hence a smaller filtrate tank (resulting in a decrease in weight compared with the tank size required for a conventional back-wash where filtration elements in all positions in the filtration vessels are back-washed simultaneously). A reduction in weight of a filtration system comprising a plurality of filtration units is of particular importance when the filtration system is part of a desalination plant located offshore on a platform or a vessel. In addition, back-washing of sets of filtration elements located at the same element positions in the filtration vessels reduces the required feed rate for the back-wash water.

The membrane filtration system according to the invention can be used for filtering various kinds of feed waters. Examples include river water, lake water, seawater, estuarine water, aquifer water and produced water (water separated from crude oil and gaseous hydrocarbons at a production facility).

Optionally, one or more chemical additives for chemically cleaning and/or disinfecting the membrane of the filtration unit may be added to the back-wash water. Suitable additives include: (1) acids such as organic acids (in particular citric acid) or protic acids (in particular, hydrochloric acid) for removing inorganic mineral scales from the filtration system; (2) bases such as sodium hydroxide or potassium hydroxide that target organic species that foul the membrane; (3) oxidants or disinfectants such as sodium hypochlorite, chlorine gas or hydrogen peroxide for removing organic materials or biofilms from the membranes; and, surfactants to remove organic materials and inert particles from the membranes. The additives are typically added to the back-wash water when it is found that back-washing the filtration elements with water alone does not restore productivity of the filtration elements.

Typically, the chemical additives are added to the back-wash water every 30 to 90 days for a sufficient period of time to clean all of the element positions of the filtration units of the skid. Suitably, after cleaning, the filtration elements are back-washed with back-wash water alone to remove residual chemical(s) from the filtration units. Optionally, a portion of the cleaning water containing one or more chemical additives is recycled, for example, up to 90% of the cleaning water may be continuously recycled to a cleaning tank with the remaining portion of the cleaning water being continuously discharged to waste. Typically, the chemical additive(s) is added to the recycled cleaning water to compensate for the chemical additive(s) discharged to waste and chemical additive(s) consumed during cleaning of the membranes of the filtration units.

The filtration unit(s) according to the invention may be used for filtering water containing suspended particulate material (suspending particles and colloids). However, as discussed above, depending on the pore size of the membrane, in addition to particles and colloids, microorganisms (for example, bacteria) and macromolecular organic species may be filtered from the feed water.

The invention will be illustrated by reference to the following Figures.

FIG. 1 shows a filtration unit according to a first embodiment of the present invention comprising a cylindrical filtration vessel 1 and a cylindrical filtration element 2. Ports 3, 3' and 4 are arranged in the wall of the filtration vessel 1. The filtration element 2 comprises a bundle of hollow fibres 5 arranged in parallel within the annular space formed between a central perforated tube 6 and an outer cylindrical sleeve 7. The central perforated tube is sealed at a first end by an end plate and is connected to port 4 via a connector pipe 8. Valves 9 and 9' are arranged on lines 10 and 10' respectively while valve 11 is arranged on line 12. Each of valves 9, 9' and 11 are independently actuatable between an open and closed position using actuators (not shown). The arrows show the direction of flow of feed water and filtrate when the filtration unit is operated in filtration mode (with valves 9, 9', and 11 in open positions). Thus feed water is fed from lines 10 and 10' through ports 3 and 3' respectively to the first and second ends of the filtration element 2 and filtrate is discharged to line 12 through port 4.

Figure 2:
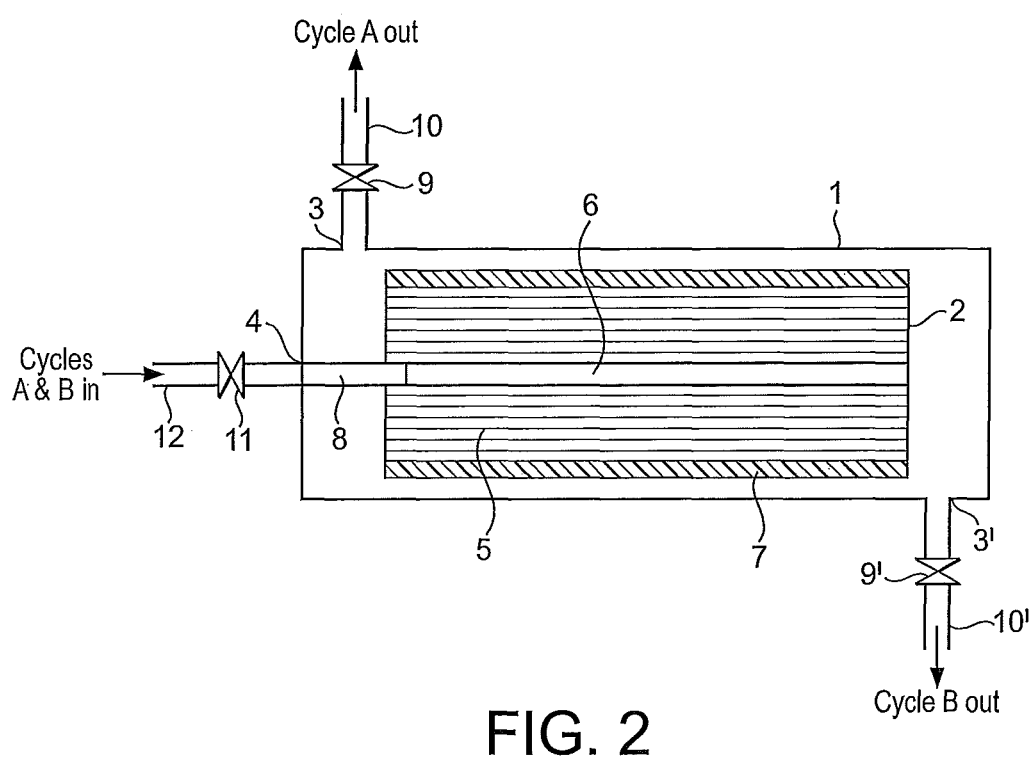
FIG. 2 shows a filtration unit according to a first embodiment of the invention during back-washing.

A back-wash cycle for the filtration unit of FIG. 1 is shown in FIG. 2. The filtration element is back-washed using two back-wash cycles which may be operated in either order. In cycle A, valves 9 and 11 are open and valve 9' is closed such that back-wash water (filtrate) is fed to the filtration vessel 1 from line 12 through port 4 and is removed from port 3 located at the left end of the filtration vessel 1. In cycle B, valves 9' and 11 are open and valve 9 is closed such that back-wash water (filtrate) enters the unit through port 4 and exits the unit through port 3' located at the right end of the filtration vessel 1. In each of these back-washing cycles, the hollow fibre elements are operated with an outside-to-inside flow path such that the back-wash water passes through the walls of the hollow fibres into the interior of the hollow fibres thereby lifting particles from the inner surface of the membrane and water contained entrained particles is removed from the left (first) end of filtration element 2 in cycle A and from the right (second) end of filtration element in cycle B.

FIG. 3 shows a filtration unit according to the present invention comprising a filtration vessel 1, end caps 50 and 60, annular seals 70 and 80, and two hollow fibre filtration elements, 2 and 2'. End ports 3 and 3', central port 3", and end ports 4 and 4' are arranged in the wall of the filtration vessel 1. The filtration elements, 2 and 2' are arranged on either side of central port 3". The filtration elements 2 and 2' comprise a bundle of hollow fibres 5 and 5' arranged in the annular space between a central perforated tube 6 and 6' and an outer cylindrical sleeve 7 and 7'. Connector pipes 8, and 8' connect the central perforated tubes 6 and 6' of the filtration elements 2 and 2' to end ports 4 and 4' respectively while connector pipe 8" connects between the central perforated tubes of the filtration elements 2 and 2'. Valves 9, 9' and 9" are located on lines 10, 10' and 10" respectively while valves 11 and 11' are arranged on lines 12 and 12' respectively. Lines 10, 10' and 10" are connected either directly or indirectly to ports 3, 3' and 3" respectively while lines 12 and 12' are connected either directly or indirectly to ports 4 and 4' respectively. Each of the valves can be independently switched between open and closed positions using actuators (not shown). The arrows show the direction of flow of feed water and filtrate when the filtration unit is operated in filtration mode with each of valves 9, 9' and 9" and each of valves 11 and 11' in open positions. Thus, feed water containing suspended particulate material flows through lines 10, 10' and 10" and enters the filtration vessel via ports 3, 3' and 3" respectively while filtrate is discharged from the filtration vessel via ports 4 and 4' into lines 12 and 12' respectively.

A back-wash cycle for the filtration membrane unit of FIG. 3 is now described with reference to FIG. 4. In this scenario, there are four back-washing cycles that may be operated in any order. In cycle A, valves 9 and 11 are open and the remaining valves are closed. Back-wash water (filtrate) therefore enters the filtration vessel 1 through the left end port 4 and exits from side port 3 located near the left end of the unit. In cycle B, valves 9" and 11 are open and the remaining valves are closed and back-wash water (filtrate) enters the filtration vessel 1 through the left end port 4 and exits from the central port 3". In cycle C, valves 11' and 9" are open and the remaining valves are closed and water enters the filtration vessel 1 through the right end port 4' and exits from the central port 3". In cycle D, valves 9' and 11' are open and the remaining valves are closed and back-wash water enters the filtration vessel through the right end port 4' and exits from the side port 3' located near the right end of the unit. In each of these back-washing cycles, the filtration element 2 or 2' is operated with an outside-to-inside flow path such that the filtrate passes through the walls of the hollow fibres into the interior of the hollow fibres thereby lifting particles from the inner surface of the membrane and water contained entrained particles is removed from a single end of the filtration element 2 or 2'.

Figure 5:
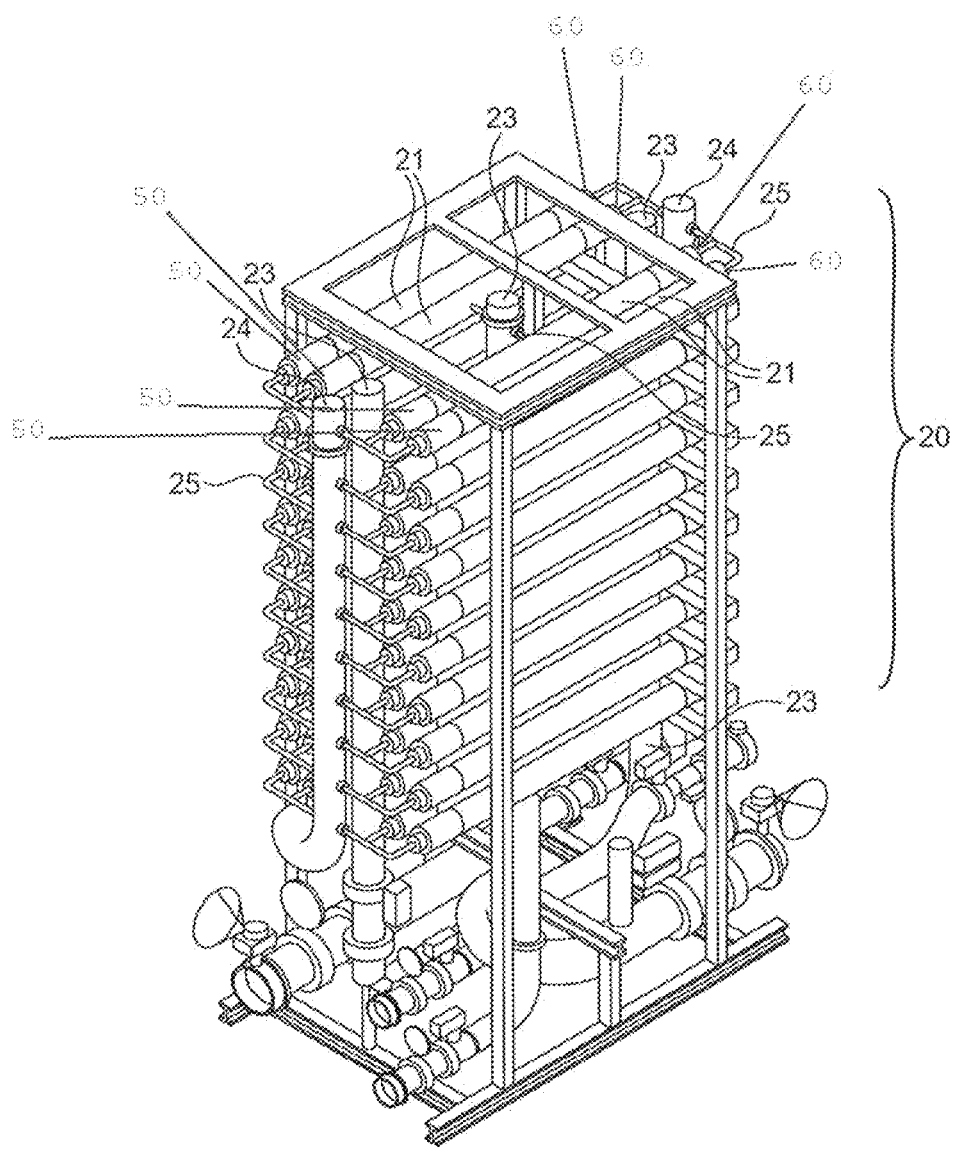
FIG. 5 shows a plurality of filtration units according to the invention arranged in a rack.

FIG. 5 illustrates a rack 20 of filtration units 21 arranged in ten rows, one above another with each row comprised of four filtration units 21. Each of the filtration units comprises a cylindrical filtration vessel that contains a first and second cylindrical hollow fibre filtration element (not shown), arranged on either side of a central feed port (not shown).

The rack has three headers 23 for feeding the feed water containing the suspended particulate material to the filtration units or for withdrawing back-wash water containing entrained particulate material from the filtration units. The rack also had two further headers 24 for discharging filtrate from the filtration units or for feeding back-wash water to the filtration units. The headers 23 and 24 are arranged substantially vertically, at a mid-point of the rack with two filtration units of each row arranged on either side thereof. The headers 23 and 24 are designed to ensure the filtration units remain liquid filled during back-washing. Pipework 25 is provided for connecting each of the filtration units to the headers 23 and 24.

The invention claimed is:

1. A method of operating a filtration system, the method comprising:
   feeding, during filtration, feed water containing suspended particulate material through a first end feed port, a second end feed port, and one or more side feed ports to an inside of each of a plurality of hollow fibres through a first inlet of each of the hollow fibres and a second inlet of each of the hollow fibres while simultaneously removing filtrate from an outside of the plurality of hollow fibres through outlets at first and/or second ends of a plurality of filtration elements, wherein the filtration elements comprise dead-end filtration elements,
   wherein the filtration system comprises at least one filtration unit including a filtration vessel having a cylindrical wall and end caps at each end of the cylindrical wall, wherein the filtration vessel is arranged horizontally with a longitudinal axis of the filtration vessel in a substantially horizontal plane; wherein the filtration vessel contains the plurality of filtration elements arranged in series with annular seals such that water is prevented from flowing around the outside of the filtration elements, wherein the plurality of filtration elements comprise the plurality of hollow fibres, wherein each hollow fibre has the first inlet at a first end thereof and the second inlet at a second end thereof, wherein longitudinal axes of the plurality of hollow fibres are substantially parallel to the longitudinal axis of the filtration vessel, wherein the first inlet and the second inlet of each hollow fibre are in fluid communication with the inside of the hollow fibre, wherein the first inlets of the plurality of hollow fibres are fluidly connected to the first end feed port in the filtration vessel and the second inlets of the plurality of hollow fibres are fluidly connected to the second end feed port in the filtration vessel, wherein the first end feed port and the second end feed port are arranged in the filtration vessel at or near the first and second ends, respectively, of the filtration vessel, the one or more side ports are arranged in the cylindrical wall of the filtration vessel with a single filtration element of the plurality of filtration elements arranged axially along the longitudinal axis of the filtration vessel on either side of each of the one or more side ports, and wherein the outlets of the plurality of filtration elements are in fluid communication with the outside of the hollow fibres; and feeding, during back-washing, back-wash water to the outside of the hollow fibres through the outlets of the plurality of filtration elements;

discharging, in a first back-wash cycle, back-wash water containing entrained particulate material from the inside of the hollow fibres through the first inlets thereof; and, discharging, in a second back-wash cycle, back-wash water containing entrained particulate material from the inside of the hollow fibres through the second inlets thereof, wherein each of the plurality of filtration elements has the first back-wash cycle and the second back-wash cycle, and wherein the first back-wash cycle and the second back-wash cycles for the plurality of filtration elements are performed sequentially in any order.

2. The method of claim 1, wherein each filtration element of the plurality of filtration element has a first outlet and a second outlet arranged at a first end of each filtration element and a second end of each filtration element, respectively; and, during filtration, removing filtrate from the outside of the hollow fibres simultaneously through both the first outlet and the second outlet of each filtration element.

3. The method of claim 1, wherein the filtration vessel of the at least one filtration unit contains a first filtration element of the plurality of filtration elements having as the first back-wash cycle, Cycle A, and as the second back-wash cycle, Cycle B, and a second filtration element of the plurality of filtration elements having as the first back-wash cycle, Cycle C, and as the second back-wash cycle, Cycle D, and:

(i) in Cycle A, feeding the back-wash water to an outlet of the first filtration element and removing back-wash water containing entrained particulates from the first inlets of the first filtration element;

(ii) in Cycle B, feeding the back-wash water to the outlet of the first filtration element and removing back-wash water containing entrained particulates from the second inlets of the first filtration element;

(iii) in Cycle C, feeding the back-wash water to an outlet of the second filtration element and removing back-wash water containing entrained particulates from the first inlets of the second filtration element; and, (iv) in Cycle D, feeding the back-wash water to the outlet of the second filtration unit and removing back-wash water containing entrained particulate from the second inlets of the second filtration element; and, wherein performing Cycles A to D is effected sequentially in any order.

4. The method of claim 1, comprising performing the first back-wash cycles for each of the plurality of filtration elements simultaneously and performing the second back-wash cycles for each of the plurality of filtration elements simultaneously, in either order.

5. The method of claim 1, wherein the plurality of filtration elements comprises from four to twelve filtration elements each having the first and the second back-wash cycle, and backwashing the four to twelve filtration elements in two or more subsets each subset comprising at least two filtration elements and backwashing the two or more subsets successively in any order by performing the first back-wash cycles for each subset of filtration elements simultaneously and performing the second back-wash cycles for each subset of filtration elements simultaneously in either order.

6. The method of claim 1, wherein the at least one filtration unit comprises a plurality of filtration units and wherein the filtration vessels of the plurality of filtration units each contain a plurality of filtration elements located at first, second and optional successive positions in the filtration vessels, each filtration element having first and second back-wash cycles, and wherein one or more of the filtration units are back-washed by performing:

the first back-wash cycles for the filtration elements located at the first positions of the filtration vessels simultaneously;

the second back-wash cycles for the filtration elements located at the first positions of the filtration vessels simultaneously;

the first back-wash cycles for the filtration elements located at the second positions of the filtration vessels simultaneously;

the second back-wash cycles for the filtration elements located at the second positions of the filtration vessels simultaneously;

the first back-wash cycles for the filtration elements located at the or each optional successive positions of the filtration vessels simultaneously; and the second back-wash cycles for the filtration elements located at the or each optional successive positions of the filtration vessels simultaneously;

wherein the simultaneous back-wash cycles for the elements located at the first, second and optional successive positions in the filtration vessels are performed sequentially in any order.

7. The method of claim 6, further comprising back-washing of the filtration elements of each filtration unit every 50 to 60 minutes.

8. The method of claim 6, wherein, during filtration, providing the feed water for the plurality of filtration units at a pressure in the range of 2 to 10 bar gauge, and at a flow rate of feed water to the first and second inlets of the hollow fibres of each of the plurality of filtration elements in the range of 1.4 to 2.5 m$^3$/hour.

9. The method of claim 8, further comprising, during back-washing, providing the back-wash water for the at least one filtration unit at a pressure in the range of 1.5 to 3.0 bar gauge and a flow rate of the back-wash water to the at least one filtration element during either the first back-wash cycle or the second back-wash cycle in the range of 40 to 50 m$^3$/hour.

10. The method claim 6, wherein the plurality of the filtration units are arranged in a rack comprising two or more banks of filtration units and the banks of filtration units are back-washed sequentially in any order.

11. The method of claim 1, further comprising periodically adding at least one cleaning chemical to the back-wash water, wherein the cleaning chemical is selected from: (1) acids for removing inorganic mineral scales from the filtration system; (2) bases that target organic species that foul the membrane; (3) oxidants or disinfectants for removing organic materials or biofilms from the membranes; and, (4) surfactants to remove organic materials and inert particles from the membranes.

12. A filtration unit comprising:
a filtration vessel having a cylindrical wall and end caps at each end of the cylindrical wall, wherein the filtration vessel is arranged horizontally with a longitudinal axis of the filtration vessel in a substantially horizontal plane; containing a plurality of dead-end filtration elements arranged in series with annular seals such that water is prevented from flowing around the outside of the filtration elements, wherein the each of the plurality of filtration elements comprises a plurality of hollow fibre microfiltration or ultrafiltration membranes wherein each hollow fibre has a first inlet and a second inlet at first and second ends thereof, respectively, in fluid communication with the inside of the hollow fibre, wherein longitudinal axes of the plurality of hollow fibres are substantially parallel to the longitudinal axis of the filtration vessel, wherein the plurality of filtration elements has an outlet at one or both of the first and second ends thereof in fluid communication with the outside of the hollow fibres, and wherein the filtration elements comprise dead-end filtration elements; wherein:
(i) the first inlets of the hollow fibres of the plurality of filtration elements are to a first dedicated feed line via a first end feed port in the filtration vessel and the second inlets of the hollow fibres of the plurality of filtration elements are connected to a second dedicated feed line via a second end feed port in the filtration vessel;
(ii) one or more side feed ports are arranged in the filtration vessel with a single filtration element of the plurality of filtration elements arranged axially along the longitudinal axis of the filtration vessel on either side of each of the one or more side ports, and wherein the one or more side feed ports are connected to a dedicated side feed line; and
(iii) the outlet of each of the plurality of filtration elements is connected to a filtrate line via a filtrate port in the filtration vessel;
wherein the first end feed port and the second end feed port are arranged in the filtration vessel at or near the first and second ends, respectively, of the filtration vessel, and wherein the first and second dedicated feed lines and the filtrate line each have a valve provided with an actuator wherein the actuators are independently actuatable to move the valves between an open and closed position.

13. The filtration unit of claim 12, wherein each of the plurality of filtration elements has a first and a second outlet arranged at the first and second ends respectively of the filtration element and the first and second outlets are connected either directly or indirectly to a first filtrate line and second filtrate line respectively via first and second filtrate ports respectively in the filtration vessel and the first and second filtrate lines have valves provided with actuators that are independently actuatable to move the valves between an open and closed position.

14. The filtration unit of claim 12, wherein the filtration vessel is a cylindrical vessel, and wherein each filtration element of the plurality of filtration elements comprises an outer cylindrical sleeve, an inner perforated pipe and a plurality of hollow fibres arranged in parallel within the annular space formed between the outer cylindrical sleeve and the inner perforated pipe; and, wherein the perforated pipes of adjacent filtration elements are connected together via tubular pipe members and the terminal end of the perforated pipe of a first filtration element in the row is connected via a tubular pipe member to a first filtrate line via a first filtrate port arranged at or near the first end of the filtration vessel and the terminal end of the perforated pipe of the final filtration element of the row is connected via a tubular pipe member to a second filtrate line via a second filtrate port arranged at or near the second end of the filtration vessel.

15. The filtration unit of claim 14, wherein the filtration vessel contains a first and second filtration element arranged in the row.

16. A filtration system comprising a controller and at least one filtration unit of claim 12, wherein:
(a) during filtration, the controller instructs the actuators to move the valves on the first dedicated feed line, the second dedicated feed line and the filtrate line to an open position; and,
(b) during back-washing, each of the plurality of filtration elements is back-washed in two cycles by the controller instructing the actuators to open and close the valves on the flow lines in sequence such the valve on the filtrate line is in an open position and, in a first back-wash cycle, the valve on the first dedicated feed line is in an open position and the valve on the second dedicated feed line is in a closed position, and, in a second back-wash cycle, the valve on the first dedicated feed line is in a closed position and the valve on the second dedicated feed line is in an open position.

17. A filtration system comprising a controller and at least one filtration unit of claim 15, wherein:
(a) during filtration, the controller instructs the actuators to move the valves on the first dedicated feed line, the second dedicated feed line, the side feed line, first filtrate line and second filtrate line to open positions; and
(b) during back-washing, the first filtration element of the filtration vessel is back-washed in a first and second back-wash cycle (Cycles A and B) and the second filtration element of the filtration vessel is back-washed in a first and second back-wash cycle (Cycles C and D) by the controller instructing the actuators to open and close the valves on the flow lines in sequence wherein:
(i) in Cycle A, the valves on the first filtrate line and first feed line are in an open position and the remaining valves in a closed position;
(ii) in Cycle B, the valves on the first filtrate line and the side feed line are in an open position and the remaining valves are in a closed position;
(iii) in Cycle C, the valves in the second filtrate line and the side feed line are in an open position and the remaining valves are in a closed position; and
(iv) in Cycle D, the valves on the second filtrate line and second feed line are in an open position and the remaining valves are in a closed position; and,
wherein the Cycles A to D may be performed sequentially in any order.

18. The filtration system of claim 17, further comprising a plurality of filtration units arranged in a rack; a set of vertical headers comprising a first vertical feed header, a second vertical feed header, an additional (side) vertical feed header, a first vertical filtrate header, a second vertical filtrate header; and, a filtrate tank, wherein the filtration units are arranged horizontally in the rack in a plurality of rows arranged one above another, and wherein the first and second vertical feed headers are in fluid communication with the first and second dedicated feed lines of each of the plurality of filtration units, the additional (side) vertical feed header is in fluid communication with the side feed line of each of the plurality of filtration units, and the first and second vertical filtrate headers are in fluid communication with the first and second filtrate lines of each of the plurality of filtration units and wherein the first and second vertical filtrate headers are also in fluid communication with the filtrate tank which is located above the rack.

19. The filtration system of claim 18, wherein the rack comprises one or more sets of vertical headers with a single bank of filtration units arranged on either side of the or each set of vertical headers and wherein each of the banks of filtration units are independently isolatable.

20. A filtration unit comprising:

a filtration vessel comprising at least two dead-end filtration elements arranged in series in the filtration vessel with annular seals such that water is prevented from flowing around the outside of the filtration elements, wherein the filtration vessel comprises a cylindrical wall and end caps at each end of the cylindrical wall, wherein the filtration vessel is arranged horizontally with a longitudinal axis of the filtration vessel in a substantially horizontal plane; wherein each of the at least two dead-end filtration elements comprises a plurality of hollow fibre microfiltration or ultrafiltration membranes, wherein each hollow fibre comprises a first inlet and a second inlet at first and second ends thereof, respectively, in fluid communication with the inside of the hollow fibre, wherein longitudinal axes of the plurality of hollow fibres are substantially parallel to the longitudinal axis of the filtration vessel, wherein each of the at least two dead-end filtration elements has an outlet at one or both of the first and second ends thereof in fluid communication with the outside of the hollow fibres, wherein each of the at least two filtration elements comprises an inner perforated pipe fluidly connected with the outside of the hollow fibres of that filtration element and wherein the inner perforated pipes of adjacent filtration elements are connected together via tubular pipe members;

a first dedicated feed line fluidly connected with the filtration vessel at or near a first end thereof, a second dedicated feed line fluidly connected with the filtration vessel at or near a second end thereof, and one or more dedicated side feed lines, wherein each of the one or more side feed lines is fluidly connected with the filtration vessel via a side feed port arranged in the cylindrical wall of the filtration vessel with a filtration element arranged axially along the longitudinal axis of the filtration vessel on either side of each of the one or more side feed ports, wherein the first inlets of the hollow fibres of one of the at least two filtration elements are connected either directly or indirectly to the first dedicated feed line via a first end feed port in the filtration vessel and the second inlets of the hollow fibres of another of the at least two filtration elements are connected either directly or indirectly to the second dedicated feed line via a second end feed port in the filtration vessel, a first filtrate line arranged at or near the first end of the filtration vessel and fluidly connected via a tubular pipe member with a terminal end of a perforated pipe of a first filtration element in the row, and a second filtrate line arranged at or near the second end of the filtration vessel and fluidly connected via a tubular pipe member to a terminal end of a perforated pipe of a final filtration element in the row;

wherein the first and second dedicated feed lines, the one or more dedicated side feed lines, and the first and second filtrate lines each comprise a valve provided with an actuator whereby the actuators are independently actuatable to move the valves between an open and closed position such that, during back-washing of each of the at least two dead-end filtration elements, back-wash water can be fed to the outside of the hollow fibres through the outlet thereof and, in a first back-wash cycle, back-wash water containing entrained particulate material can be discharged from the inside of the hollow fibres through the first inlets thereof; and, in a second back-wash cycle, back-wash water containing entrained particulate material can be discharged from the inside of the hollow fibres through the second inlets thereof.

* * * * *